(12) United States Patent
Hall et al.

(10) Patent No.: US 7,980,332 B1
(45) Date of Patent: Jul. 19, 2011

(54) DOWNHOLE CENTRIFUGAL DRILLING FLUID SEPARATOR

(76) Inventors: David R. Hall, Provo, UT (US); Joe Fox, Spanish Fork, UT (US); Scott S. Dahlgren, Alpine, UT (US); David Lundgreen, Provo, UT (US)

( * ) Notice: Subject to any disclaimer, the term of this patent is extended or adjusted under 35 U.S.C. 154(b) by 0 days.

(21) Appl. No.: 12/910,963

(22) Filed: Oct. 25, 2010

Related U.S. Application Data

(63) Continuation of application No. 12/910,924, filed on Oct. 25, 2010.

(51) Int. Cl.
 *E21B 21/12* (2006.01)
(52) U.S. Cl. ......................... 175/324; 175/339
(58) Field of Classification Search .................. 175/107, 175/339, 340, 324
See application file for complete search history.

(56) References Cited

U.S. PATENT DOCUMENTS

| | | | |
|---|---|---|---|
| 3,094,175 A * | 6/1963 | Jackson | 175/69 |
| 3,400,819 A | 9/1968 | Burdyn | |
| 4,103,749 A | 8/1978 | Erickson | |
| 4,245,710 A * | 1/1981 | Dolezal et al. | 175/337 |
| 4,436,166 A | 3/1984 | Hayatdavoudi et al. | |
| 4,475,603 A | 10/1984 | Hayatdavoudi | |
| 4,488,607 A | 12/1984 | Hayatdavoudi et al. | |
| 4,512,420 A | 4/1985 | Hayatdavoudi et al. | |
| 4,515,229 A * | 5/1985 | Drummond et al. | 175/337 |
| 4,587,024 A | 5/1986 | Hayatdavoudi | |
| 4,646,858 A * | 3/1987 | Strickland | 175/337 |
| 4,670,161 A | 6/1987 | Hayatdavoudi | |
| 4,673,045 A * | 6/1987 | McCullough | 175/339 |
| 4,688,650 A | 8/1987 | Hayatdavoudi et al. | |
| 5,143,162 A | 9/1992 | Lyon et al. | |
| 5,303,784 A | 4/1994 | Awdujewski et al. | |
| 5,355,967 A | 10/1994 | Mueller et al. | |
| 5,482,117 A * | 1/1996 | Kolpak et al. | 166/265 |
| 5,490,571 A * | 2/1996 | Hanns et al. | 175/323 |
| RE39,292 E * | 9/2006 | Latos et al. | 166/265 |
| 2005/0284641 A1 | 12/2005 | Watkins | |
| 2007/0027036 A1 | 2/2007 | Polizzotti et al. | |
| 2010/0175869 A1 | 7/2010 | Cobb | |

* cited by examiner

*Primary Examiner* — Daniel P Stephenson
(74) *Attorney, Agent, or Firm* — Tyson J. Wilde; Philip W. Townsend, III

(57) ABSTRACT

In one aspect of the invention, a downhole centrifugal drilling fluid separator has a bore within a tubular body comprising a central axis. The bore is formed to receive drilling fluid comprising particulate matter. At least one fin rigidly fixed within the bore and at least one port formed in a wall of the tubular body. As the drilling fluid flows through the tubular body the at least one fin creates a rotary motion within the drilling fluid forcing a portion of the particulate matter away from the central axis and through the at least one port in the tubular body.

14 Claims, 11 Drawing Sheets

DOWNHOLE CENTRIFUGAL DRILLING FLUID SEPARATOR

CROSS REFERENCE TO RELATED APPLICATIONS

This application is a continuation of U.S. patent application Ser. No. 12/910,924, which was filed on Oct. 25, 2010.

BACKGROUND OF THE INVENTION

The present invention relates to downhole drilling assemblies, specifically downhole drilling assemblies for use in oil, gas, geothermal, and horizontal drilling. Drilling fluid may comprise any of a number of liquid and gaseous fluids and mixtures of fluids and solids used in operations to drill boreholes into the earth. In these operations, drilling fluid may remove cuttings from the well, control formation pressures, seal permeable formations, maintain wellbore stability, and minimize formation damage.

Controlling the drilling fluid's weight may contribute to maintaining the stability of the wellbore. As formation pressures increase, the drilling fluid's weight may also be increased to maintain the wellbore's integrity. However, in some situations, where the drilling fluid's weight exerts a pressure against the formation that is significantly lower than the formation pressure, the formation's pressure may cause the well bore to collapse. The prior art discloses applications where drilling fluid weight has been altered to contribute to drilling applications.

U.S. Patent Publication No. 2005/0284641 to Watkins et al., which is herein incorporated by reference for all that it contains, discloses a variable density fluid for wellbore operations and a method of drilling a wellbore using a variable density fluid where the density of the fluid changes by design as a function of external parameters which vary along the depth or length of the well. The variable density of the fluid is beneficial for controlling sub-surface pressures within desirable pore pressure and fracture gradient envelopes. The variability of fluid density permits construction and operation of a wellbore with much longer hole sections than when using conventional single gradient fluids.

U.S. Pat. No. 4,103,749 to Erickson et al., which is herein incorporated by reference for all that it contains, discloses a centrifugal cleaner powered by a turbine. Both the centrifugal cleaner and turbine are downhole in a housing at the end of a drill string. A branch of a drilling mud stream is cleaned of solid matter by the centrifugal cleaner. A branch of the clean fluid drives the turbine of the centrifugal cleaner. A second branch of the clean fluid does useful work at the downhole location, such as erosive drilling of bore hole rock. Turbine exhaust, cleaner exhaust and drilling mud combine and flow into the rock erosion zone to clear it of chips formed by the drilling. Fluid from this zone passes up the annulus between the bore hole and the drill string.

BRIEF SUMMARY OF THE INVENTION

In one aspect of the present invention, a downhole centrifugal drilling fluid separator may comprise a bore within a tubular body. The tubular body may comprise a central axis and may be formed to receive drilling fluid comprising particulate matter. At least one fin may be rigidly fixed within the bore and at least one port formed in a wall of the tubular body. As drilling fluid flows through the tubular body, the at least one fin may create a rotary motion within the drilling fluid forcing a denser portion of the drilling fluid, which comprises more concentrated particulate matter, away from the central axis and through the at least one port.

The at least one fin may comprise a rounded leading edge followed by a sharp trailing edge to decrease drag. In one embodiment, a plurality of fins may be spaced around a circumference of the bore to further facilitate a rotary motion within the drilling fluid. The plurality of fins spaced around the circumference may share substantially the same angle of attack. The plurality of fins may also be attached to both the tubular body and to a hub disposed at the central axis of the tubular body. The fins may also be spaced axially along the bore with increasing angles of attack in the direction of the drilling fluid flow.

In another embodiment of the present invention, a plurality of ports may be spaced around the circumference of the bore. The plurality of ports may direct fluid comprising particulate matter into the annulus of the wellbore. The bore may comprise a tapered diameter adjacent to the plurality of ports. The tapered diameter may facilitate the flow of the portion of denser drilling fluid through the plurality of ports. The tapered diameter may also permit a lighter portion of drilling fluid comprising a reduced concentration of particulate matter to continue flowing through the bore.

The lighter portion of drilling fluid may be used for power generation, drilling, steering, or for use with other downhole tools. The lighter portion may be directed to the drill bit nozzles, where the fluid exits. As the lighter portion travels up the annulus of the wellbore, it may coalesce with the denser portion of drilling fluid, and a mixture of the denser and lighter portions of fluid may travel up the remainder of the annulus together.

In another embodiment of the present invention, a method for separating mixed drilling mud downhole may include the following steps: providing a bore within a tubular body comprising a central axis, a drill bit with at least one nozzle, at least one fin, and at least one port; pumping a mixed drilling mud through the bore; forcing a denser portion of the mixed drilling mud away from the central axis of the bore through the centrifugal force created by the at least one fin; directing the denser portion of drilling mud through the at least one port and a lighter portion of drilling mud through the length of the bore to the drill bit and into the borehole to facilitate drilling; merging the denser and lighter portions of drilling mud in the annulus of the borehole and circulating the mixed drilling mud to the surface of the borehole; and directing the lighter portion of drilling mud through the drill bit.

In another aspect of the present invention, a downhole drilling fluid separator has a bore within a tubular body with a central axis and formed to receive drilling fluid. At least one fin is disposed within the bore, and at least one downhole tool is disposed within a primary pathway downstream of the at least one fin. An alternate pathway is also downstream of the least one fin and by passes the at least one tool. The primary and alternate pathways converge downstream of the at least one tool. As drilling fluid flows through the tubular body the at least one fin creates a rotary motion within the drilling fluid forcing a denser portion of the fluid into the alternate pathway while a lighter portion of the fluid is routed into the primary pathway.

In yet another aspect of the present invention, a downhole drilling fluid separator has a bore within a tubular body with a central axis and formed to receive drilling fluid. At least one fin is disposed within the bore, and a primary pathway and an alternate pathway are downstream of the at least one fin. The alternate pathway is configured to direct drilling fluid towards a center of the tubular body. As the drilling fluid flows through the tubular body the at least one fin creates a rotary motion within the drilling fluid forcing a denser portion of the fluid into the primary pathway which leads towards a center of the tubular body while a lighter portion of the fluid is routed into the alternate pathway which leads towards a periphery of the tubular body.

DETAILED DESCRIPTION OF THE INVENTION AND THE PREFERRED EMBODIMENT

Figure 1:
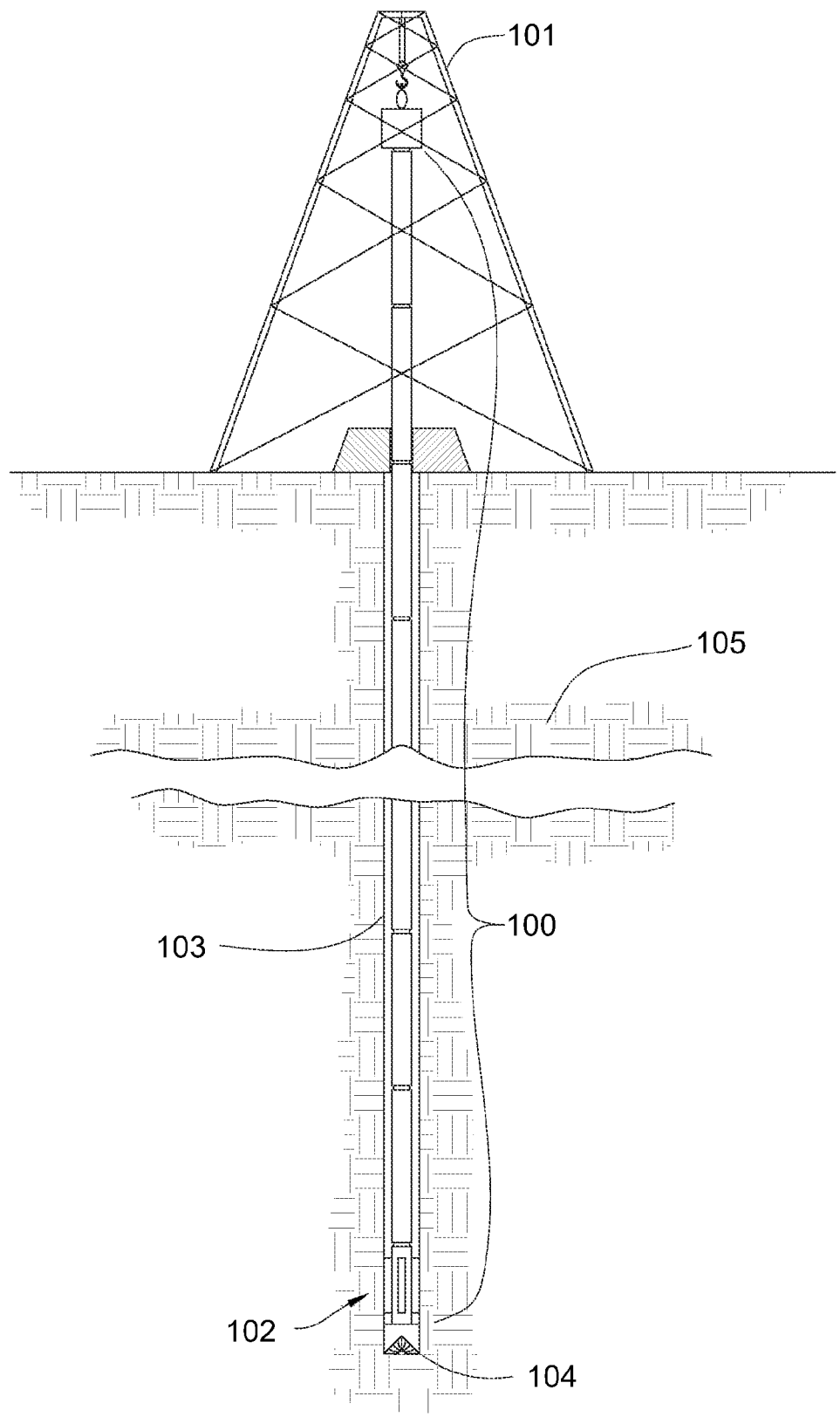
FIG. 1 is a cutaway view of an embodiment of a downhole drill string suspended from a drill rig.

Referring now to the figures, FIG. 1 displays a cutaway view of an embodiment of a downhole drill string 100 suspended from a drill rig 101. A downhole assembly 102 may be located at some point along the drill string 100 and a drill bit 104 may be located at the end of the drill string 100. As the drill bit 104 rotates downhole, the drill string 100 may advance farther into soft or hard earthen formations 105. The downhole assembly 102 and/or downhole components may comprise fluid separation devices. Further, surface equipment may send data and/or power to downhole tools and/or the downhole assembly 102.

Figure 2:
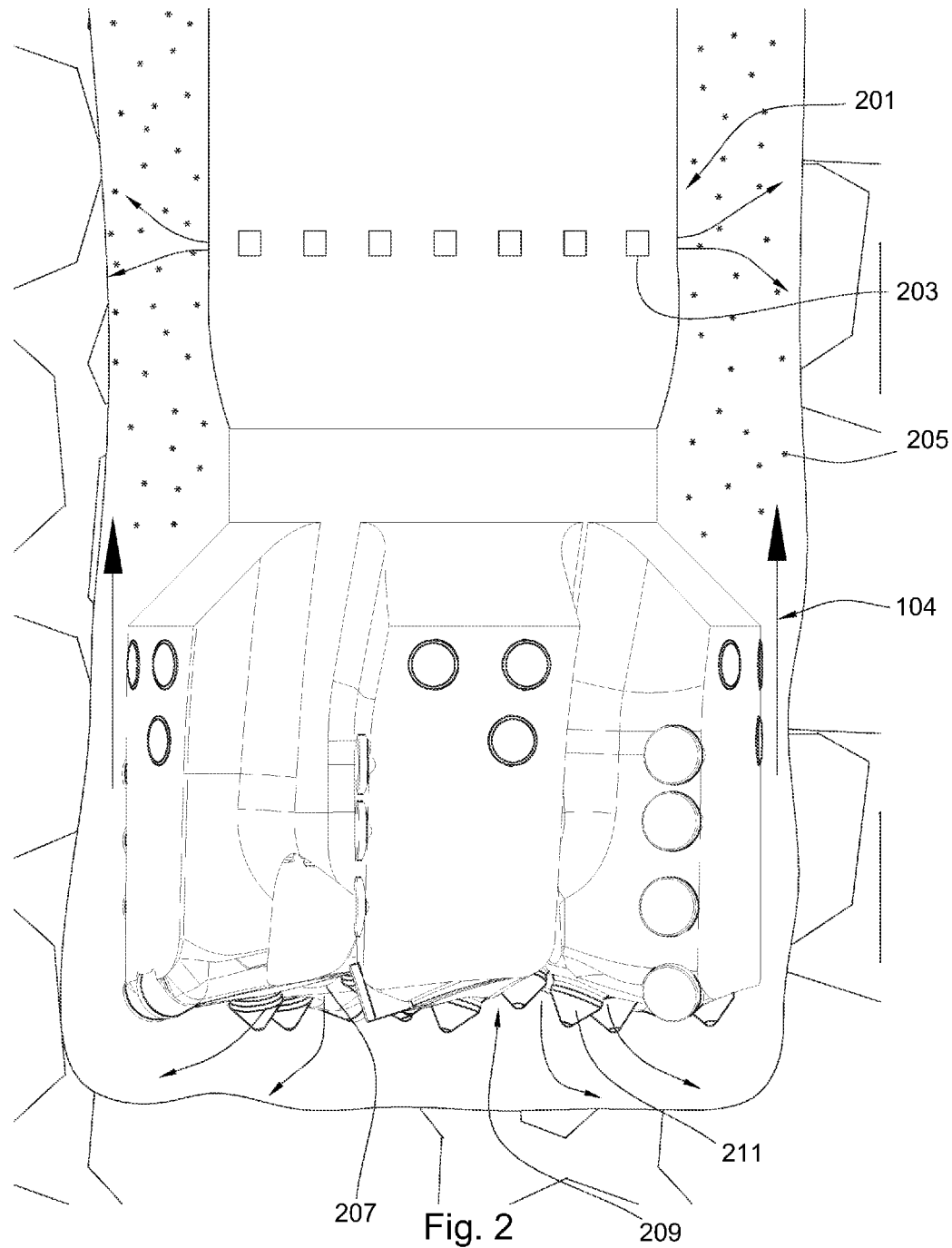
FIG. 2 is a cutaway view of an embodiment of a drill bit connected to a downhole centrifugal drilling fluid separator.

FIG. 2 is a cutaway view of an embodiment of a drill bit 104 connected to a downhole centrifugal drilling fluid separator 201. The centrifugal drilling fluid separator 201 may comprise a plurality of exhaust ports 203 formed in the wall 250 of the tubular component. The exhaust ports 203 may direct a denser portion of drilling fluid with a higher concentration of particulate matter 205 into the annulus of the borehole. At least one nozzle 207 may be disposed on the working face 209 of the drill bit 104 and a lighter portion of drilling fluid with a lower concentration of particulate matter 205 may exit these nozzles.

The lighter portion of drilling fluid may clear debris from the working face 209 of the drill bit 104 before coalescing with the denser portion up the annulus. The combined lighter and denser portion may travel to the surface of the borehole together.

The lighter portion of drilling fluid may cake the bottom of the wellbore with less particulate matter than it would have without the separation, thereby, only minimally interfering with the cutting elements 211 ability to cut fresh formation.

Also, since a significant amount of particulate matter is removed from the lighter portion, the lighter portion may exert a lower pressure against the wellbore's floor. Thus, in only selected regions of the wellbore, such as at the drill bit, a controlled under balance drilling situation may be created. This may result in the formation's pressure contributing to breaking the wellbore's floor, thus, enabling more efficient drilling. Up the annulus, where the denser portion combines with the lighter portion, the drilling fluid's weight may be more appropriately matched to push against the wellbore's wall and prevent cave-ins.

Figure 3:
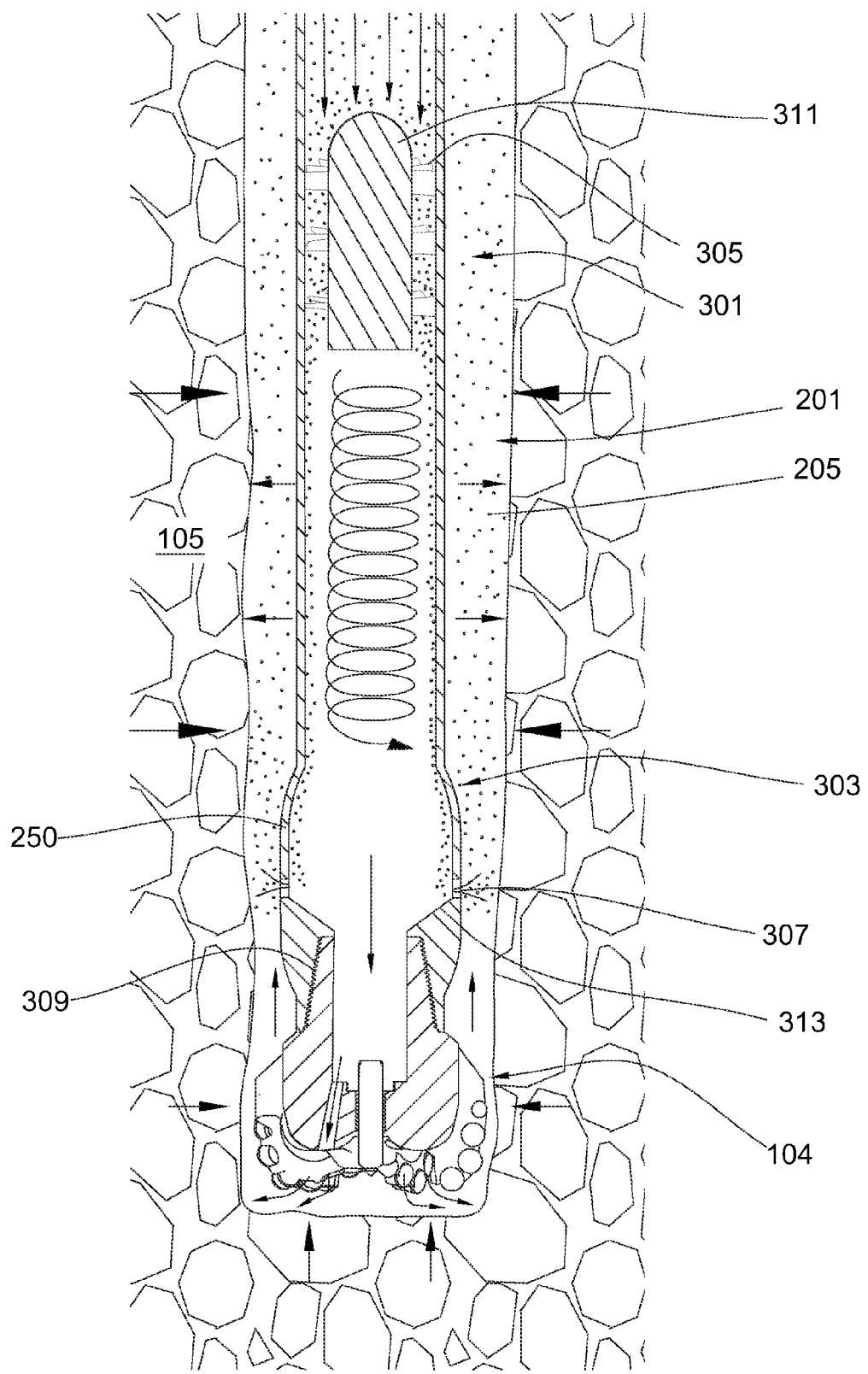
FIG. 3 is a cross sectional view of an embodiment of a drill bit connected to a downhole centrifugal drilling fluid separator.

FIG. 3 is a cross sectional view of an embodiment of a drill bit 104 connected to a downhole centrifugal drilling fluid separator 201. The downhole centrifugal drilling fluid separator 201 may comprise a bore within a tubular body. The tubular body may comprise a first section 301 and a second section 303. A plurality of fins 305 may be disposed within the bore of the first section 301 and the second section 303 may comprise a plurality of exhaust ports 307. The second section may form a threaded connection 309 with the drill bit 104 (or other tool string component), thus, the drill bit 104 is in fluid communication with the second section 303. The underbalanced condition requires less effort to penetrate into the formation 105, thus, increasing the rate of penetration and durability of the drill bit 104.

The plurality of fins 305 may be rigidly attached to the inner diameter of the first section 305 and to a hub 311 disposed along the central axis of the tubular body. Drilling fluid pumped through the plurality of fins 305 may comprise a predetermined concentration of particulate matter 205. The predetermined concentration may be chosen at the surface of the borehole and may be determined by many factors including the depth of drilling and properties of the formation 105. Drilling fluid pumped through the plurality of fins 305 may create a rotary motion within the drilling fluid forcing particulate matter 205 away from the central axis, thus, forming a denser and lighter portion of drilling fluid. The denser portion of drilling fluid may be propelled further towards the inner diameter due to its heavier weight, while the lighter portion may remain closer to the center of the sections.

The drilling fluid may flow into the second section 303 of the tubular body in their separated conditions. The second section 303 may have an increased diameter leading to a plurality of exhaust ports 307 adjacent to a tapered ledge 313. Since inertia is acting on the denser drilling fluid, it may follow the increased diameter leading to the exhaust ports. The lighter portion of drilling fluid may continue to flow into the drill bit and out of the nozzles.

Figure 4:
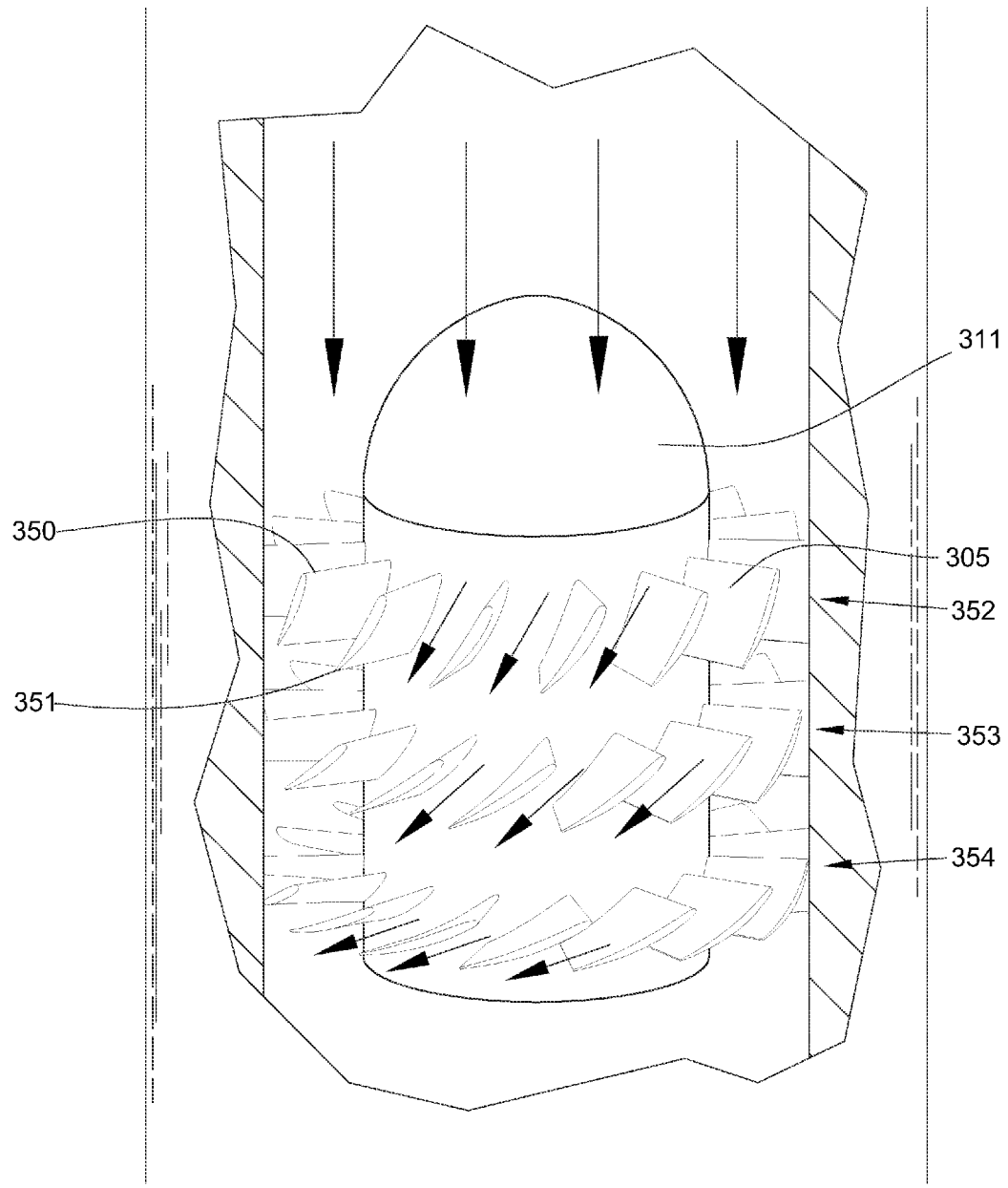
FIG. 4 is a cutaway view of an embodiment of a plurality of fins attached to a central hub and a tubular body.

FIG. 4 is a cutaway view of an embodiment of a plurality of fins 305 attached to a central hub 311 and to an inner diameter of the tubular body. The fins are rigidly fixed to the hub, which is rigidly fixed to the inner diameter of the bore wall. Thus, this hub and fins are not configured to rotate independent of the inner diameter. Instead, this hub and fins are designed to force the drilling fluid to change's its trajectory. The fins 305 may be welded, bolted, or otherwise rigidly fastened to the hub 311 and the tubular body. The plurality of fins 305 may comprise a rounded leading edge 350 followed by a sharp trailing edge 351 to decrease drag. Each fin in a leading row 352 may be spaced around the circumference of the central hub 311 and may have substantially the same angle of attack. The succeeding trailing rows 353, 354 may progressively increase in angle and may be configured to enhance the centrifugal effect on the drilling mud. While only three rows are shown in the embodiment of FIG. 4, the scope of the inventions includes any number of rows and any range of increasingly steeper angles.

Fluid may be pumped through the plurality of fins 305. Each row of fins 305 may affect the direction of the fluid flow without a single level of fins 305 taking all the force and wear caused by the force of the flowing fluid. The amount of relative centrifugal force acting upon the fluid may be dependent on the flow rate of the fluid being pumped into the downhole system. As the flow rate increases, so does the amount of force available to separate out particulate matter.

Figure 5:
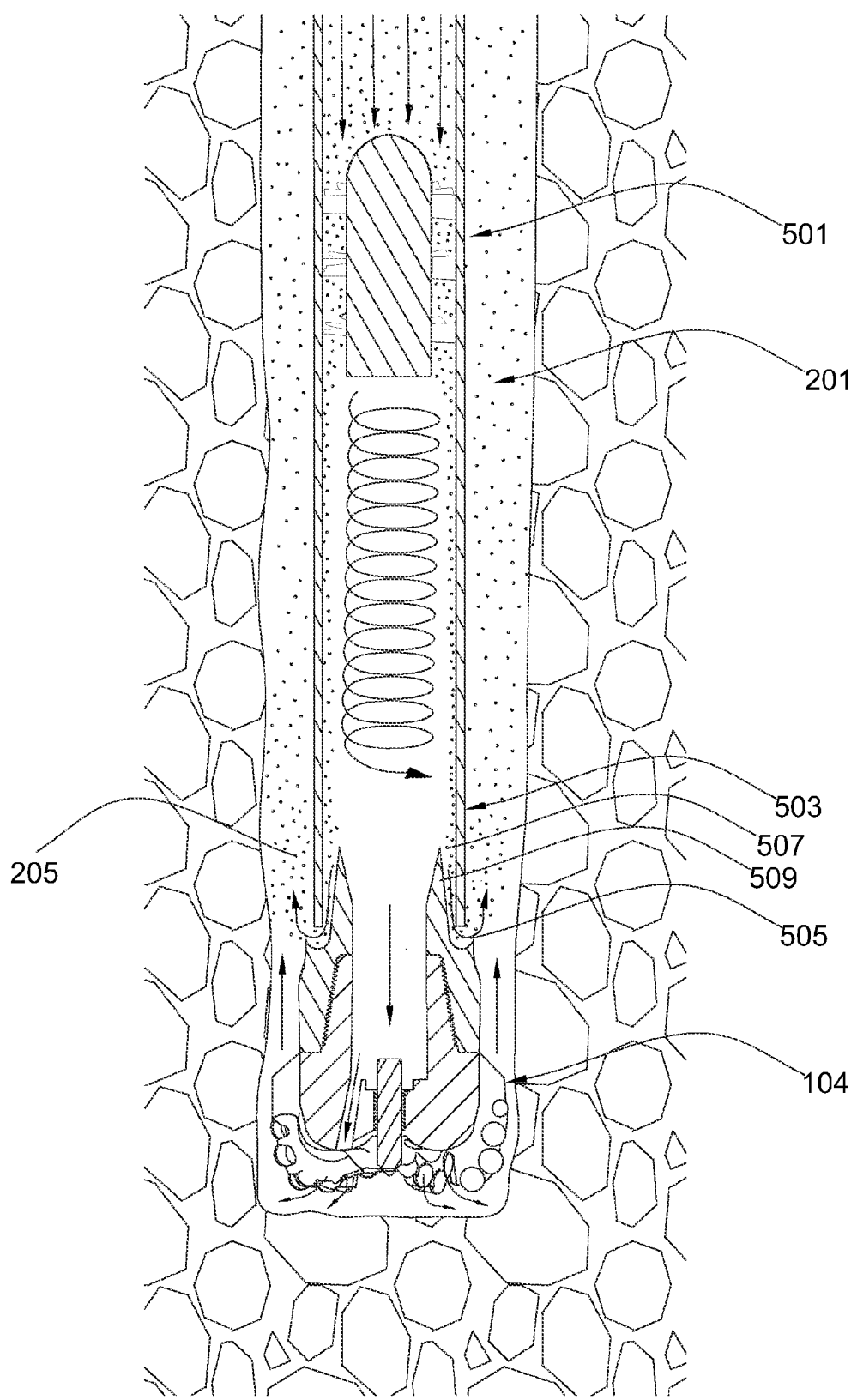
FIG. 5 is a cross sectional view of an embodiment of a drill bit connected to a downhole centrifugal drilling fluid separator.

FIG. 5 comprises a first section 501 that comprises a plurality of fins 505 and a second section that comprises a plurality of exhaust ports 505 adjacent to an annular fluid channel 507 formed in the tubular body. The fluid channel 507 may be formed by a guide barrier 509 that extends into the bore formed in the tubular body of the first section 501.

The channel may comprise a narrowing thickness as it approaches the exhaust ports 505. The exhaust ports 505 may comprise a cup shaped geometry that may transfer the downward force of the drilling fluid into an upward force inducing the lighter and denser portions of drilling fluid to coalesce above the exhaust ports 505. The fluid channel 507 and cup shaped geometry may further allow for less buildup of dense drilling fluid as it passes through the exhaust ports 505 preventing a buildup of particulate matter 205.

Figure 6:
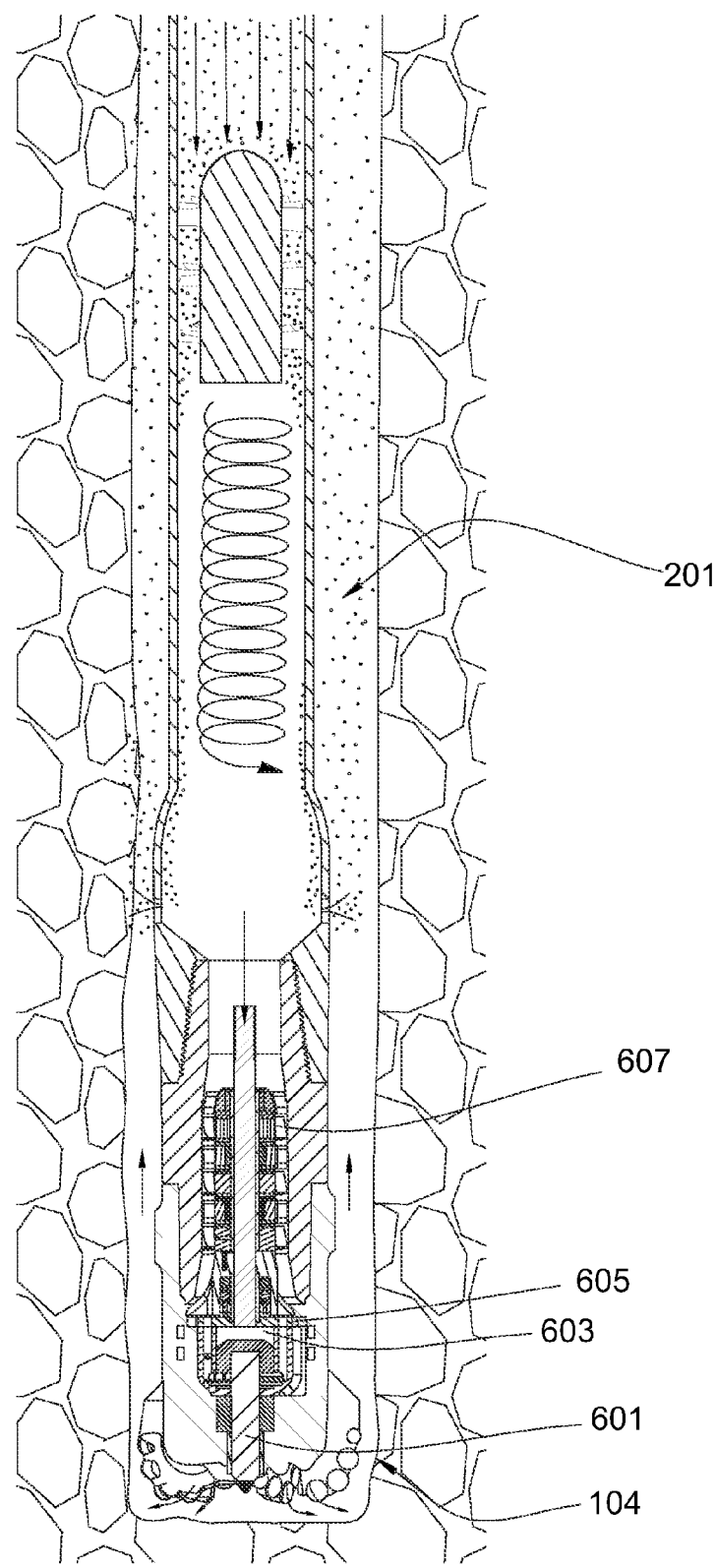
FIG. 6 is a cross sectional view of an embodiment of a downhole centrifugal drilling fluid separator.

FIG. 6 is a cross sectional view of an embodiment of a downhole centrifugal drilling fluid separator 201 connected to a drill bit 104 comprising a deployable center indenting element 601 or other center residing drilling components, such as turbines, motors, electronics, pumps, mud sirens, jars, and combinations thereof. The deployable center indenting element 601 may be actuated by drilling fluid flowing into a piston chamber 603. A porting mechanism 605 may direct the drilling fluid into the piston chamber 603 such that the deployable center indenting element 601 generates a hammering action while drilling. The drill bit 104 may further comprise at least one turbine 607 in connection with the porting mechanism 605 to direct the drilling fluid.

Lighter drilling fluid may flow through the at least one turbine 607 and into the porting mechanism 605 and the hammering action of the center indenting element 601 may provide increased efficiency in the drilling process. The lighter drilling fluid may reduce the wear on both the porting mechanism 605 and at least one turbine 607 while reducing the buildup of particulate matter in the piston chamber 603.

In some embodiments, the denser drilling fluid may be expelled out of the tool string above the bottom-hole assembly, preventing the drilling fluid's caking effect to plug up the downhole tool's equipment or wear down their components. The denser portion of drilling fluid may be expelled out of the tool string above any component that may be potentially harmed by dense drilling fluid.

Figure 7:
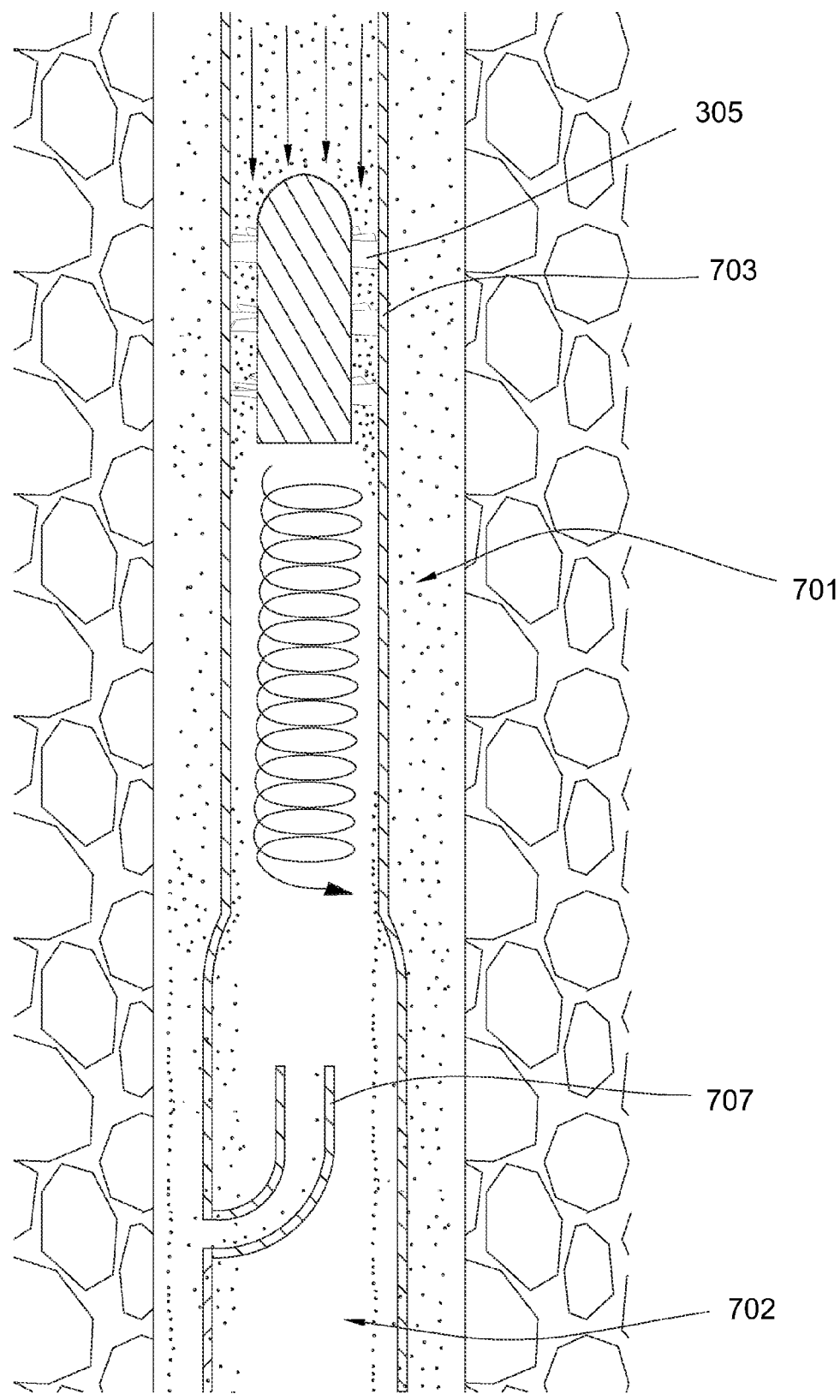
FIG. 7 is a cross sectional view of an embodiment of a downhole centrifugal drilling fluid separator.

FIG. 7 discloses a primary and alternate pathway 707, 702 disposed downstream of the hub and fins 305. The lighter drilling fluid flows into the primary pathway, which routes the drilling mud out of the tubular body 703 and into the annulus 701 of the wellbore. Thus, the drilling fluid that remains in the tubular body comprises an increased concentration of particulate matter and/or is a heavier weight. In some embodiments, downhole tools like mud driven motors may be operate better with a heavier drilling mud weight. In some embodiments, the lighter portion of the drilling fluid may comprise lost circulation material and/or fibrous materials that are lighter than the heavier portion of the drilling fluid.

Figure 8:
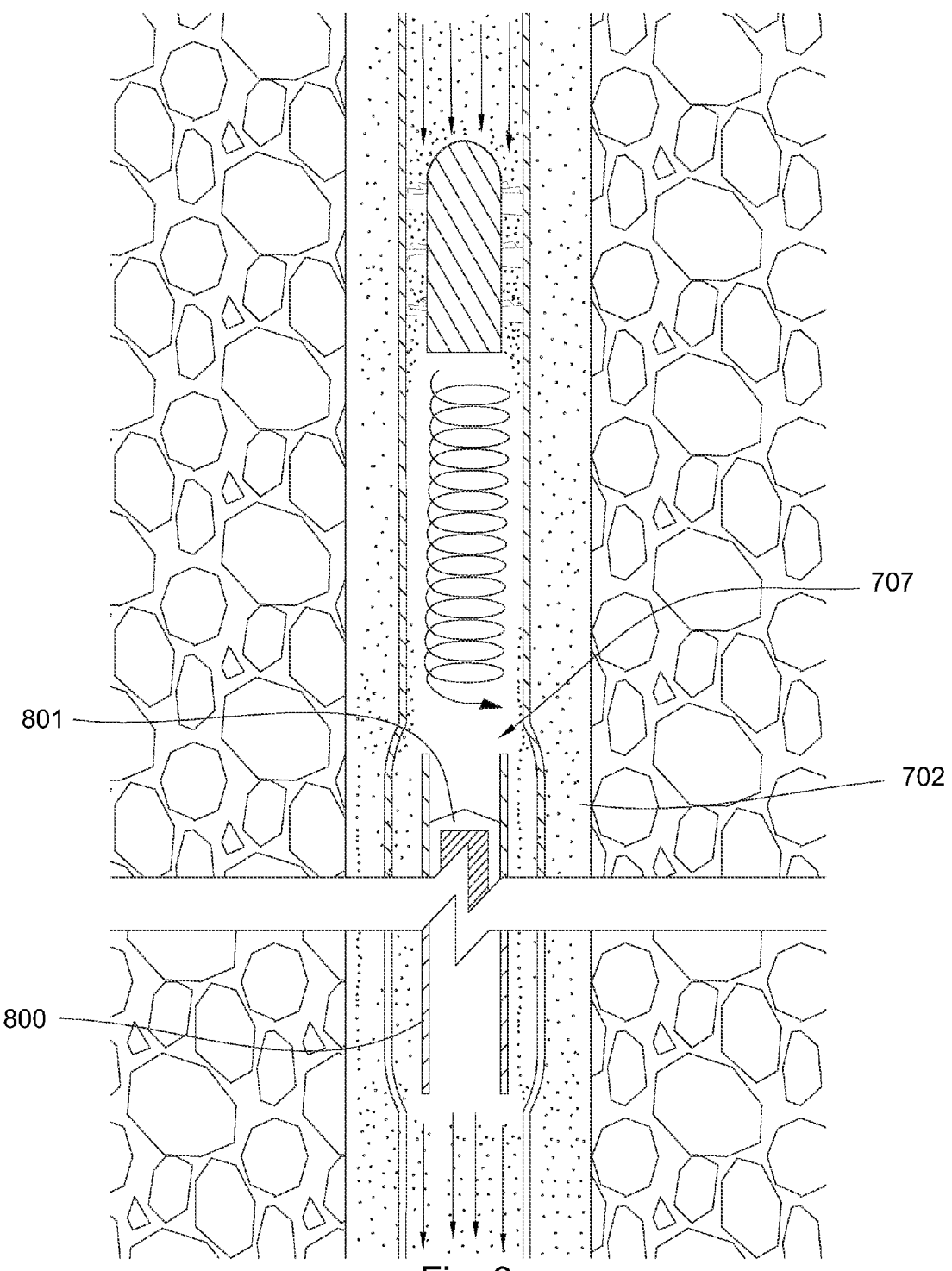
FIG. 8 is a cross sectional view of an embodiment of a downhole centrifugal drilling fluid separator.

FIG. 8 discloses the primary and secondary pathways 707, 702 being concentric to one another. The alternate pathway may be annular, and the pathways are separated be a tubular structure 800. The primary pathway comprises a downhole tool 801, which may be configured to operate ideally in a lighter weight drilling mud. In some embodiments, the downhole tool may comprise ports and/or small apertures, which may easily cake off in a heavy weight drilling mud. The downhole tool may also be a mechanism that is configured to further separate out the drilling weight densities. In the embodiment of FIG. 8, the heavier weight drilling mud may bypass the tool by traveling down the alternate pathway. The lighter and heavier weight drilling muds may recombine when the primary and alternate pathways converge downstream of the downhole tool.

Figure 9:
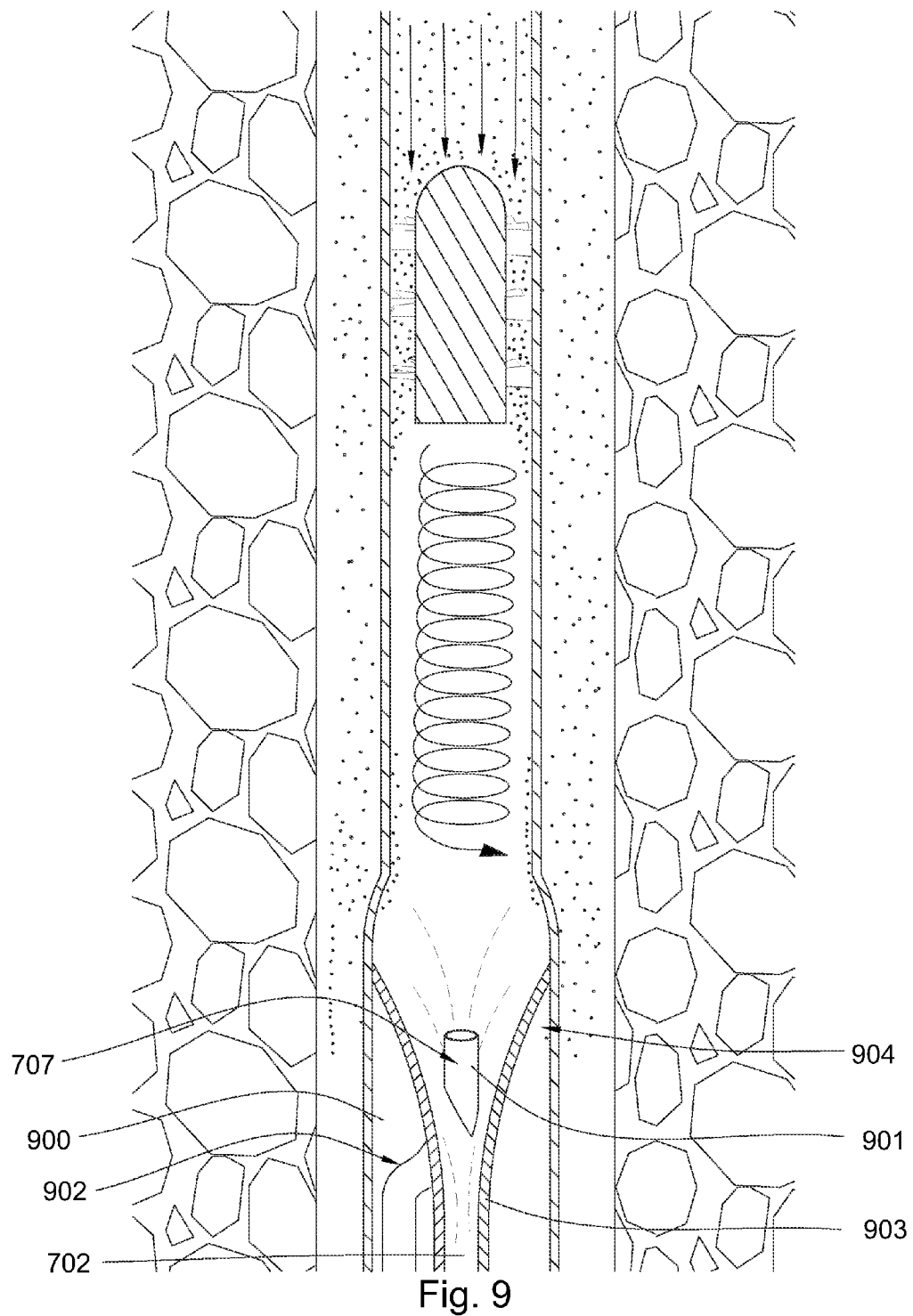
FIG. 9 is a partial cross sectional view of an embodiment of a downhole centrifugal drilling fluid separator.

FIG. 9 discloses the primary pathway 707 routing the lighter portion of the drilling fluid to the periphery 900 of the tubular body, while the alternate pathway 702 directs the heavier weight drilling mud into the center of the tubular body. An upstream section 901 of the primary pathway may collect the lighter weight drilling fluid and curve to the periphery as the pathway continues downstream. A curved section 902 of the primary pathway may cross a barrier 903 that forms the alternate pathway.

The heavier weight drilling mud may be routed from the periphery of the tubular body towards the center through a narrowing diameter 904 of the barrier 903. A downhole tool configured to operate more efficiently may be disposed within a central portion of the alternate pathway. In some embodiments, the alternate and primary pathway may converge and downstream.

Figure 10:
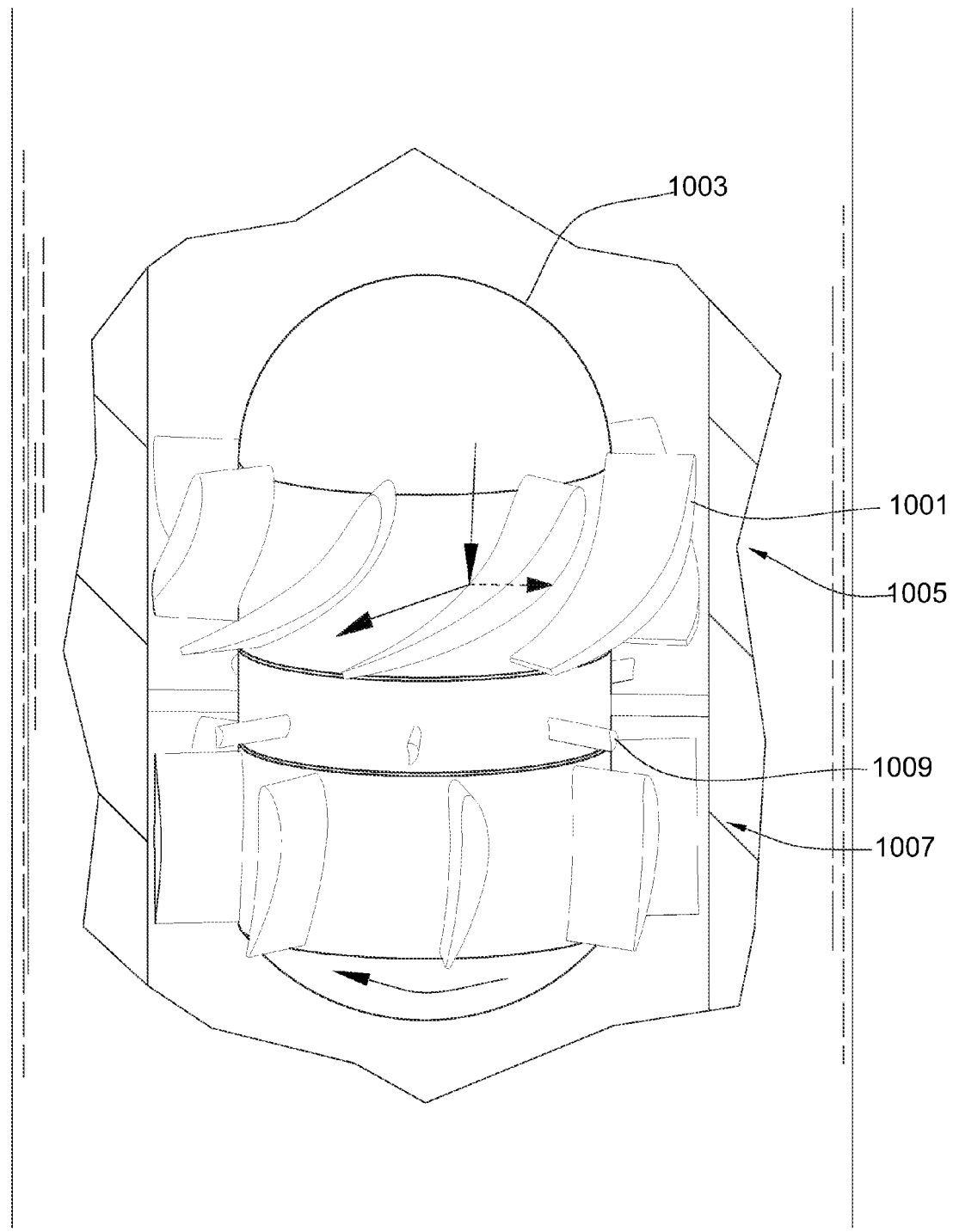
FIG. 10 is a cutaway view of an embodiment of a plurality of dynamic fins attached to a central hub.

FIG. 10 is a cutaway view of an embodiment of a plurality of dynamic fins 1001 attached to a central hub 1003 in a tubular body. The plurality of dynamic fins 1001 may comprise a first and second level 1005, 1007 separated by a plurality of stators 1009. The first level 1005 of dynamic fins may comprise a greater attack angle than the second level 1007. The plurality of stators 1009 may be rigidly attached to the tubular body. As fluid flows through the tubular body, the first level 1005 of fins direct the fluid into a circular motion while fins move in the opposite direction. The second level of fins 1007 may spin in the same direction as the fluid, thus, inducing a greater centrifugal force.

Figure 11:
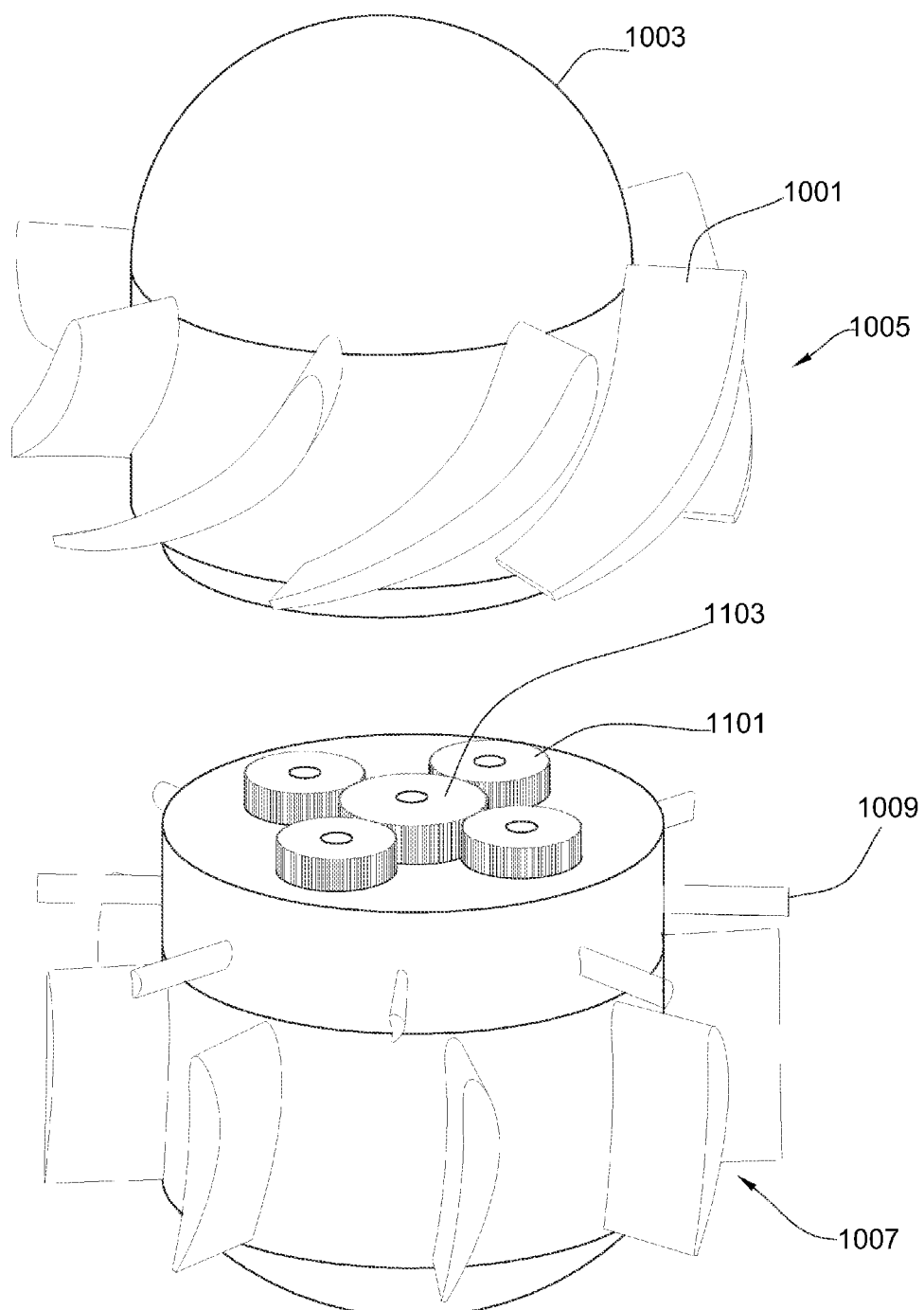
FIG. 11 is a perspective view of another embodiment of a plurality of dynamic fins attached to a central hub.

FIG. 11 is a perspective view of another embodiment of a plurality of dynamic fins 1001 attached to a central hub 1003. The plurality of dynamic fins 1001 may comprise a first and second level 1005, 1007. The first and second level 1005, 1007 may be separated by a plurality of stators 1009. The first level 1005 may be in mechanical connection with at least one outer gear 1101 and the at least one outer gear 1101 may be in mechanical connection with a central gear 1103. The central and outer gears 1101, 1103 may comprise a gear ratio such that every turn of the outer gear 1101 may result in multiple turns of the central gear 1103. The central gear 1103 may be in mechanical connection with the second level of dynamic fins 1007 so as the central gear 1103 completes a revolution, so will the second level of dynamic fins 1007.

What is claimed is:

1. A downhole drilling fluid separator, comprising:
   a bore within a tubular body comprising a central axis and formed to receive drilling fluid;
   at least one fin disposed within the bore;
   a primary pathway and an alternate pathway are downstream of the at least one fin;
   the alternate pathway is configured to direct drilling fluid towards a center of the tubular body;
   wherein as drilling fluid flows through the tubular body the at least one fin creates a rotary motion within the drilling fluid forcing a denser portion of the fluid in the alternate pathway which leads towards a center of the tubular body while a lighter portion of the fluid is routed into the primary pathway which leads towards a periphery of the tubular body and the lighter portion comprises lost circulation material and/or fibrous materials.

2. The separator of claim 1, wherein a downhole tool is disposed within the alternate pathway.

3. The separator of claim 2, wherein the downhole tool is a motor.

4. The separator of claim 2, wherein the downhole tool comprise electronic equipment.

5. The separator of claim 1, wherein the alternate pathway is routed outside of the tubular body.

6. The separator of claim 1, wherein the primary and alternate pathways are concentric of each other.

7. The separator of claim 1, wherein the alternate pathway is annular.

8. The separator of claim 1, wherein the alternate and primary pathways converge downstream.

9. The separator of claim 1, wherein at least one additional fin that causes a rotary motion within the drilling fluid is disposed within the primary pathway.

10. The separator of claim 1, wherein the at least one fin is rigidly fixed to the bore of the tubular body.

11. The separator of claim 1, wherein the primary pathway is substantially aligned with a central axis of the primary pathway.

12. The separator of claim 1, wherein the alternate pathway is substantially aligned with a central axis of the primary pathway.

13. The separator of claim 1, wherein the primary and alternate pathways are separated by a tubular structure.

14. The separator of claim 1, wherein another mechanism for separating drilling fluid densities is disposed within the primary pathway.

* * * * *